United States Patent
Pyzik et al.

(10) Patent No.: US 7,025,825 B2
(45) Date of Patent: Apr. 11, 2006

(54) PLASTIC FIBERS FOR IMPROVED CONCRETE

(75) Inventors: Aleksander J. Pyzik, Midland, MI (US); Hari Reddy, Midland, MI (US); Kenneth B. Stewart, Jr., Lake Jackson, TX (US); Kwanho Yang, Midland, MI (US); Sharon M. Allen, Midland, MI (US); Ted A. Morgan, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 49 days.

(21) Appl. No.: 10/889,815

(22) Filed: Jul. 13, 2004

(65) Prior Publication Data

US 2004/0258911 A1 Dec. 23, 2004

Related U.S. Application Data

(62) Division of application No. 09/891,799, filed on Jun. 26, 2001, now Pat. No. 6,780,367.

(60) Provisional application No. 60/214,643, filed on Jun. 28, 2000.

(51) Int. Cl.
C04B 16/06 (2006.01)
(52) U.S. Cl. ............... 106/802; 106/644; 106/724; 428/294.7; 428/299.7; 428/369
(58) Field of Classification Search ............ 106/644, 106/724, 802; 428/375, 383, 378, 369, 294.7, 428/299.7; 429/394
See application file for complete search history.

(56) References Cited

U.S. PATENT DOCUMENTS

| 2,825,721 A | 3/1958 | Hogan et al. ............... 260/88.1 |
| 2,993,876 A | 7/1961 | McGlamery ............... 260/45.5 |
| 3,250,825 A | 5/1966 | Martinovich ............... 260/897 |
| 3,305,528 A | 2/1967 | Wynstra et al. ............. 260/47 |
| 3,315,021 A | 4/1967 | Luaaztlo ..................... 264/168 |
| 3,316,336 A | 4/1967 | Smith ......................... 264/171 |
| 4,033,781 A | 7/1977 | Hauser et al. ............... 106/90 |
| 4,204,050 A | 5/1980 | Bressler et al. ............. 526/97 |
| 4,229,224 A | 10/1980 | Dawson et al. ............. 106/90 |
| 4,246,219 A | 1/1981 | Yu et al. ..................... 264/171 |
| 4,357,290 A | 11/1982 | Yu ............................. 264/147 |
| 4,414,030 A | 11/1983 | Restrepo ..................... 106/90 |
| 4,414,276 A | 11/1983 | Kiriyama et al. ........... 428/374 |
| 4,445,833 A | 5/1984 | Moriki et al. ............. 425/131.5 |
| 4,564,600 A | 1/1986 | Ali et al. .................... 436/513 |
| 5,093,061 A | 3/1992 | Bromley et al. ........... 264/171 |
| 5,149,768 A | 9/1992 | White et al. ................ 528/89 |
| 5,171,820 A | 12/1992 | Mang et al. ................ 528/87 |
| 5,272,236 A | 12/1993 | Lai et al. ................. 526/348.5 |
| 5,275,853 A | 1/1994 | Silvis et al. ............... 428/35.4 |
| 5,278,272 A | 1/1994 | Lai et al. ................. 526/348.5 |
| 5,399,195 A | 3/1995 | Hansen et al. .............. 106/711 |
| 5,456,752 A * | 10/1995 | Hogan ........................ 106/802 |
| 5,496,910 A | 3/1996 | Mang et al. ................ 528/112 |
| 5,628,822 A * | 5/1997 | Hogan ........................ 106/802 |
| 5,753,368 A | 5/1998 | Berke et al. ................ 428/375 |
| 5,993,537 A | 11/1999 | Trottier et al. ............. 106/724 |
| 6,423,134 B1 * | 7/2002 | Trottier et al. ............. 106/802 |

OTHER PUBLICATIONS

U.S. Appl. No. 60/214,643; entitled: Platic Fibers for Improved Concrete; filed: Jun. 28, 2000; A. J. Pyzik, et al.
*Encyclopedia of Polymer Science and Engineering*; vol. 12; pp. 1-62; 1988 revision; John Wiley & Sons.
*Hawley's Condensed Dictionary 12th Edition*; R. Lewis; Van Nostrand Co., NY; p. 239; 1993.

* cited by examiner

Primary Examiner—Paul Marcantoni

(57) ABSTRACT

A concrete article comprised of concrete having therein a reinforcing fiber, where at least about 50 percent of the reinforcing fibers are frayed only at an end or ends of the reinforcing fibers, may be made by mixing concrete, water and a reinforcing fiber for a sufficient time to fray the ends of at least 50 percent of the fibers and curing the mixture to form the concrete article. The fiber may be a reinforcing fiber comprised of at least two filaments bonded together and the filaments being comprised of a polymeric core and a polymeric sheath comprised of a fusing-fraying polymer, such that the reinforcing fiber, when mixed with inorganic particulates, frays predominately only at an end or ends of the fiber.

11 Claims, No Drawings

PLASTIC FIBERS FOR IMPROVED CONCRETE

CROSS-REFERENCE TO RELATED APPLICATION

This application is a division application Ser. No. 09/891,799, filed Jun. 26, 2001, now U.S. Pat. No. 6,780,367, claims the benefit of U.S. Provisional Application Ser. No. 60/214,643, filed Jun. 28, 2000.

FIELD OF THE INVENTION

The invention relates to plastic fibers for toughening concrete and the concrete containing the fibers.

BACKGROUND OF THE INVENTION

Generally, concrete is a brittle material with high compressive strength but low tensile strength. In the concrete industry, all concrete work is, typically, specified on the basis of the compressive strength. Any attempt to improve the crack strength (tensile strength) and toughness of the concrete almost always requires the introduction of reinforcing addition. For example, rebar (steel rods) is added which provide structural integrity but does not eliminate cracking. Metal mesh has also been added to reduce cracking but it cannot be used effectively to reinforce concrete of complex geometry.

Plastic fibers have also been used to improve the tensile strength and toughness (resistance to cracking). However, the addition of synthetic polymer fibers almost always causes a reduction in the compressive strength. In addition, when plastic fibers are used they tend to only improve either the tensile strength (strength before the first crack appears) or the toughness (resistance to cracking), but not both at the same time.

Examples of plastic fibers include polypropylene (PP), polyethylene (PE), polyethylene terephthalate (PET), aramids (e.g., KEVLAR) and polyvinyl alcohol fibers. However, all of these fibers suffer from one or more problems, such as high cost, low alkaline resistance, low tenacity or low interfacial bonding between the concrete and the fiber.

Polypropylene and polyethylene have been the most preferred fiber to date due to their high tenacity and low cost. Unfortunately, these fibers suffer from very low interfacial bonding. To remedy this problem, coatings have been formed on the surface of the fibers by applying a liquid, such as glycerol ether or glycol ether on the fiber surface, as described by WO 9807668. Coatings have also been applied by vapor deposition, such as described by JP 60054950. Similarly, chemically modifying the surface has been done, such as described by JP 10236855 (treatment of the surface of a polyoxyalkylenephenyl ether phosphate and polyoxalkyl fatty acid ester). Unfortunately, these methods naturally lead to increased cost, complexity and potentially insufficient bonding of the coating to the fiber.

Another remedy has been the incorporation of inorganic particles in and on the fiber, such as described by JP 07002554. Unfortunately, the fiber process becomes much more difficult (e.g., fiber breakage) and increases the cost and, generally, decreases the tenacity of the fiber.

Further, it is known that larger fibers are preferable for improving the toughness of the concrete. Unfortunately, larger fibers further exacerbate the problem of bonding with the concrete matrix because of reduced surface area. In addition, none of these methods address another problem associated with plastic fibers in concrete, which is the tendency of larger fibers to clump together into balls that are difficult to break up when added to concrete resulting in reduced properties of the concrete.

U.S. Pat. No. 5,993,537 and WO 99/46214 describe uncontrolled fibrillation of large fibers in concrete. They describe the desirability of fibrillating large fibers into many smaller fibers and partially fibrillated fibers. They both describe that fibrillation desirably should be so great that the surface area of the fibers increase 50 fold or more. However, this extreme amount of fibrillation may lead to problems with workability, slumping, mixing and lessen desirable toughness enhancement of larger fibers.

Accordingly, it would be desirable to provide an improved fiber for improving the properties of concrete, for example, that solves one or more of the problems of the prior art, such as improving the toughness without increasing the cost of concrete when using inexpensive polypropylene fibers, while at the same time not create other problems, such as slumping and reduced workability.

SUMMARY OF THE INVENTION

We have now discovered a new polymeric fiber that has improved bonding with concrete that results in concrete that has improved properties, lower cost or both, compared to other reinforced concrete, which is achieved by a fiber that has controlled fibrillation.

A first aspect of the invention is a reinforcing fiber comprised of at least two filaments bonded together and the filaments being comprised of a polymeric core, at least partially enveloped by a polymeric sheath comprised of a fusing-fraying polymer that has a lower melting temperature than the polymer core, such that the reinforcing fiber, when mixed with inorganic particulates, frays predominately only at an end or ends of the fiber.

The reinforcing fiber is comprised of at least two filaments that are bonded together, such that upon mixing with inorganic particles, the filaments predominately fray at the ends of the fibers (i.e., frays or fibrillates at the ends) under typical mixing conditions, for example, of concrete. This controlled fraying of the fiber overcomes the problem of inadequate bonding of large diameter fibers by giving greater surface area to anchor to at the ends, while not causing a deleterious rise in viscosity when fibers completely fibrillate.

Herein, predominately fraying at the end or ends means that under typical mixing conditions encountered when making inorganic cured articles, such as concrete, a majority of the fibers present in the article after curing have not separated into two or more fibers. This is analagous to the fraying of a rope without the rope splitting into two smaller ropes.

A second aspect of the invention is a concrete article comprised of concrete having therein a reinforcing fiber where at least about 50 percent by number of the reinforcing fibers are frayed only at an end or ends of the reinforcing fibers.

A third aspect of the invention is a method of preparing concrete comprised of mixing concrete, water and a reinforcing fiber for a sufficient time to fray the ends of at least about 50 percent of the fibers and curing the mixture to form the concrete article. Generally, this amount of fraying results in an increase of surface area of at least about 2 times to generally at most about 10 times, preferably at most about 5 times and more preferably at most about 3 times of the surface area of the original fiber.

A fourth aspect is a reinforcing fiber comprised of a polypropylene core polymer at least partially enveloped by a sheath comprised of a fusing/fraying polymer that has a lower melting temperature than the polypropylene core and is selected from the group consisting of low density polyethylene, maleic anhydride grafted low density polyethylene, ethylene-styrene copolymer or polyethylene having a melt index from about 5 to about 35 and a density from about 0.9 gram per cc to about 0.965 gram per cc, ethylene acrylic acid copolymer and combinations thereof.

The reinforcing fiber may be used in any low temperature cured inorganic article, such as concrete, mortar, gypsum, wall board and the like. The concrete of this invention may be used in any application suitable for concrete, but it is especially well-suited for parking garages, bridge decks, white toppings, tunnels, mining, slope stabilization, architectural purposes, such as landscaping stones, skate boarding rinks, modern architecture, art sculptures, fast setting/non-slumping ceilings, swimming pools and for repairing and retrofitting existing structures.

DETAILED DESCRIPTION OF THE INVENTION

The Reinforcing Fiber

The reinforcing fiber is comprised of at least two fused filaments comprised of a core polymer at least partially enveloped by a sheath comprised of a fusing-fraying polymer, such that the fiber, when mixed with inorganic particulates, frays predominately only at an end or ends of the fiber.

Fraying at an end or ends is when the fiber splits into at least two distinct frayed fibrils, where one end of these fibrils is completely detached from the fiber and the other end is still attached to the fiber. To reiterate, this is similar to a rope fraying at the ends. Generally, the frayed fibrils are at most about half the length of the fiber prior to being frayed. Preferably, the frayed fibrils are at most about one third (1/3), more preferably at most two fifths (2/5) and most preferably at most about one quarter (1/4) the length of the fiber prior to being frayed.

To reiterate, the reinforcing fiber frays predominately at an end or ends when a majority (i.e., greater than 50 percent by number) of said fibers fray only at an end or ends when mixed using a concrete mixer having a concrete mix of about 50 to 70 percent by weight aggregate balance Portland cement and a Portland cement to water ratio of about 0.4 to about 0.6 by weight. The amount of fraying may be determined by known microscopic techniques. Preferably at least about 60 percent, more preferably at least about 75 percent, even more preferably at least 90 percent and most preferably at least 95 percent of the fibers are frayed only at an end or ends after this mixing. A most preferred embodiment is when essentially all of the fibers are frayed only at the end or ends of the fibers.

The increase in frayed surface helps to improve toughness of the reinforced concrete. However, when fraying is too extensive toughness decreases. In other words, the initial fraying leads to improvement in toughness, but too much fraying/fibrillation is detrimental. Generally, the toughness increases when the surface area of the fiber due to fibrillation increases from at least about 2 times until about 3 times, levels off until about 5 times, slowly decreases from 5 to 10 times and then drastically decreases above about 10 times the surface area of the original fiber surface area.

The reinforcing fiber is comprised of at least two filaments that have been fused together. The reinforcing fiber may be comprised of any useful amount of filaments greater than or equal to two. Generally, the amount of filaments that are bonded together is at most about 3000. Preferably, the amount of filaments is at least about 12, more preferably at least about 36, most preferably at least about 72 to preferably at most about 1000, more preferably at most about 500 and most preferably at most about 350.

The reinforcing fiber may be in any shape (i.e., shape of the cross-section), such as round, square, triangular, lobed, star and sheet (i.e., similar to a tape). The filaments may be fused by any suitable method, such as fusing the filaments as they are being made by one of the processes described below.

As made, the fibers, generally, are about 0.25 to about 4 inches long. Preferably, the fibers are at least about 0.6 to at most about 3 inches long. Generally, each filament is at least about 0.5 µm (micrometers) to about 1000 µm (micrometers) in cross-sectional area. Preferably, each filament is at least about 1 to at most about 500 µm (micrometers) in cross-sectional area. Generally, the fiber is at least about 2 to at most about 2000 µm (micrometers) in cross-sectional area. Preferably, the fiber is at least about 6 to at most about 500 µm (micrometers) in cross-sectional area. More preferably, the fiber is at most about 100 µm (micrometers) and most preferably at most about 50 µm (micrometers) in cross-sectional area.

Generally, the core polymer comprises at least about 50 percent by volume to at most about 95 percent by volume of the reinforcing fiber. Preferably, the core polymer comprises at least about 55 percent, more preferably at least about 60 percent and most preferably at least about 65 percent to preferably at most about 75 percent.

The core polymer may be any polymer useful in forming the reinforcing fiber so long as the core polymer is different than a polymer comprising the sheath. A polymer is different when the chemistry is different (e.g., polycarbonate versus polyethylene) or the properties (structure) are different (e.g., branched versus linear polyethylene and high density polyethylene versus low density polyethylene).

For example, the core polymer may be polyolefins, thermoplastic hydroxy-functionalized polyether or polyester, polyesters, polyamides, polyethers, polysaccharides, modified polysaccharides or naturally-occurring fibers or particulate fillers; thermoplastic polyurethanes, thermoplastic elastomers and glycol-modified copolyester (PETG). Other polymers of the polyester or polyamide-type can also be employed in the practice of the present invention for preparing the fiber. Such polymers include polyhexamethylene adipamide, polycaprolactone, polyhexamethylene sebacamide, polyethylene 2,6-naphthalate and polyethylene 1,5-naphthalate, polytetramethylene 1,2-dioxybenzoate and copolymers of ethylene terephthalate and ethylene isophthalate.

The thermoplastic hydroxy-functionalized polyether or polyester may be any suitable kind, such as those known in the art. For example, they can be one of those described by U.S. Pat. Nos. 5,171,820; 5,275,853; 5,496,910; 5,149,768 and 3,305,528.

The polyesters and methods for their preparation are well-known in the art and reference is made thereto for the purposes of this invention. For purposes of illustration and not limitation, reference is particularly made to pages 1–62 of Volume 12 of the *Encyclopedia of Polymer Science and Engineering*, 1988 revision, John Wiley & Sons.

The polyamides may include the various grades of nylon, such as nylon 6, nylon 6,6 and nylon 12.

By the term "polyolefin" is meant a polymer or copolymer derived from simple olefin monomers, such as ethylene, propylene, butylene, isoprene, and the like and one or more monomers copolymerizable therewith. Such polymers (including raw materials, their proportions, polymerization temperatures, catalysts and other conditions) are well-known in the art and reference is made thereto for the purpose of this invention. Additional comonomers, which can be polymerized with ethylene, include olefin monomers having from 3 to 12 carbon atoms, ethylenically unsaturated carboxylic acids (both mono- and difunctional) and derivatives of such acids, such as esters (for example, alkyl acrylates) and anhydrides. Exemplary monomers, which can be polymerized with ethylene, include 1-octene, acrylic acid, methacrylic acid, vinyl acetate and maleic anhydride.

The polyolefins, for example, include polypropylene, polyethylene, and copolymers and blends thereof, as well as ethylene-propylene-diene terpolymers. Preferred polyolefins are polypropylene, linear high density polyethylene (HDPE), heterogeneously-branched linear low density polyethylene (LLDPE), such as DOWLEX polyethylene resin (a trademark of The Dow Chemical Company), heterogeneously-branched ultra low linear density polyethylene (ULDPE), such as ATTANE ULDPE (a trademark of The Dow Chemical Company); homogeneously-branched, linear ethylene/α-olefin copolymers, such as TAFMER (a trademark of Mitsui Petrochemicals Company Limited) and EXACT (a trademark of Exxon Chemical Company); homogeneously branched, substantially linear ethylene/α-olefin polymers, such as AFFINITY (a trademark of The Dow Chemical Company) and ENGAGE (a trademark of DuPont Dow Elastomers L.L.C) polyolefin elastomers, which can be prepared as disclosed in U.S. Pat. Nos. 5,272,236 and 5,278,272; and high pressure, free radical polymerized ethylene polymers and copolymers, such as low density polyethylene (LDPE), ethylene-acrylic acid (EAA) copolymers, such as PRIMACOR (trademark of The Dow Chemical Company), and ethylene-vinyl acetate (EVA) copolymers, such as ESCORENE polymers (a trademark of Exxon Chemical Company), and ELVAX (a trademark of E.I. du Pont de Nemours & Co.). The more preferred polyolefins are the homogeneously-branched linear and substantially linear ethylene copolymers with a density (measured in accordance with ASTM D-792) of 0.85 to 0.99 gram per cm$^3$, a weight average molecular weight to number average molecular weight ratio (Mw/Mn) from 1.5 to 3.0, a measured melt index (measured in accordance with ASTM D-1238 (190/2.16)) of 0.01 to 100 gram per 10 minutes, and an I10/I2 of 6 to 20 (measured in accordance with ASTM D-1238 (190/10)).

In general, high density polyethylene (HDPE) has a density of at least about 0.94 gram per cubic centimeter (gram per cc) (ASTM Test Method D-1505). HDPE is commonly produced using techniques similar to the preparation of linear low density polyethylenes. Such techniques are described in U.S. Pat. Nos. 2,825,721; 2,993,876; 3,250,825 and 4,204,050. The preferred HDPE employed in the practice of the present invention has a density of from 0.94 to 0.99 gram per cc and a melt index of from 0.01 to 35 grams per 10 minutes, as determined by ASTM Test Method D-1238.

The polysaccharides, which can be employed in the practice of the present invention, are the different starches, celluloses, hemicelluloses, xylanes, gums, pectins and pullulans. Polysaccharides are known and are described, for example, in the *Encyclopedia of Polymer Science and Technology,* 2nd edition, 1987. The preferred polysaccharides are starch and cellulose.

The modified polysaccharides, which can be employed in the practice of the present invention, are the esters and ethers of polysaccharides, such as, for example, cellulose ethers and cellulose esters, or starch esters and starch ethers. Modified polysaccharides are known and are described, for example, in the *Encyclopedia of Polymer Science and Technology,* 2nd edition, 1987.

The term "starch" as used herein, refers to carbohydrates of natural vegetable origin composed mainly of amylose and/or amylopectin, and includes unmodified starches, starches which have been dewatered but not dried, physically modified starches, such as thermoplastic, gelatinized or cooked starches, starches with a modified acid value (pH) where acid has been added to lower the acid value of a starch to a range of from 3 to 6, gelatinized starches, ungelatinized starches, cross-linked starches and disrupted starches (starches which are not in particulate form). The starches can be in granular, particulate or powder form. They can be extracted from various plants, such as, for example, potatoes, rice, tapioca, corn, pea and cereals, such as rye, oats, and wheat.

Celluloses are known and are described, for example, in the *Encyclopedia of Polymer Science and Technology,* 2nd edition, 1987. Celluloses are natural carbohydrate high polymers (polysaccharides) consisting of anhydroglucose units joined by an oxygen linkage to form long molecular chains that are essentially linear. Cellulose can be hydrolyzed to form glucose. The degree of polymerization ranges from 1000 for wood pulp to 3500 for cotton fiber, giving a molecular weight of from 160,000 to 560,000. Cellulose can be extracted from vegetable tissues (wood, grass, and cotton). Celluloses can be used in the form of fibers.

The sheath at least partially envelops the core polymer. "Partially" generally means that at least about 10 percent of the surface of the core polymer is covered by the sheath polymer. Preferably, at least about 20 percent, more preferably at least 50 percent, even more preferably at least about 75 percent and most preferably at least about 90 percent of the surface of the core polymer is covered by the sheath. A preferred embodiment includes a sheath that essentially covers the entire surface of the core polymer or entirely covers the core polymer.

The core polymer preferably is polyolefin, nylon and polyester. More preferably, the core polymer is polypropylene, homopolymer of polyethylene, nylon or polyester. Most preferably, the core polymer is polypropylene having a melt flow rate from about 4 to 20.

The sheath is comprised of a fusing-fraying polymer (FF polymer). The FF polymer provides for the fusing of filaments as the reinforcing fiber is formed and the controlled fraying at the ends when the fiber is mixed with inorganic particles, such as concrete. The FF polymer may also allow the core to be compatible with other sheath components, such as a mechanical activator polymer described below. "Compatible" means that there is sufficient adhesion of the sheath to the core so that upon mixing, for example, in concrete, the fibers do not completely separate under typical mixing conditions used, for example, in making concrete. It is also believed to help in dispensing and dispersing of the fibers when mixed with concrete.

The FF polymer may be any polymer as long as it has a lower melting temperature than the core polymer and results in sufficient adherence of the sheath to the core polymer. The melting temperature of the FF polymer should be low enough so that during fiber spinning, the FF polymer allows melting of the sheath causing the fusing of filaments without substantially affecting the core polymer. This controlled fusing is believed to allow for the controlled fraying when the fibers are later mixed with inorganic particles, such as concrete. The FF polymer may also provide improved chemical bonding of the fiber, for example, to concrete.

Generally, the FF polymer has a melting temperature that is at least 10° C. lower than the core polymer melt temperature. Preferably, the FF polymer temperature is at least 15, more preferably at least about 20 and most preferably at least about 30 to preferably at most about 100.

Illustratively, when the fiber core is polypropylene having a melt flow rate of 12, the FF polymer is desirably polyethylene having a melt index between 5–35 and a density between 0.9 gram per cc to 0.965 gram per cc in combination with either an ethylene-styrene copolymer, with a low styrene content or a low density PE (0.870 gram per cc).

Preferably, the FF polymer is an ethylene styrene copolymer with low styrene content (below 30 percent of styrene by weight), ethylene styrene copolymer with high styrene content (above 60 percent of styrene by weight), low density PE (e.g., 0.870 gram per cc), low density polyethylene grafted with maleic anhydride (MAH), maleic anhydride-grafted polypropylene, ethylene acrylic acid copolymer (e.g., PRIMACOR), polyethylene, ethylene-methacrylic acid or combinations thereof. Most preferably, the FF polymer is ethylene acrylic acid copolymer. The ethylene acrylic acid copolymer is preferably one that is 5–20 percent acrylic acid groups by weight and more preferably 9–14 percent by weight acrylic acid groups.

The sheath may contain other components, such as a mechanical activator polymer. The mechanical activator polymer may be used to increase the surface roughness of the reinforcing fiber, which is believed to increase the mechanical bonding of the fiber, for example, to a concrete matrix. The mechanical activator polymer may be employed in any useful amount up to an amount of at most, typically, about 20 percent by volume of the sheath. The mechanical activator polymer has one or more of the following: (i) thermal expansion sufficiently different than the FF polymer, (ii) immiscible with the FF polymer, (iii) solubilized or swelled by water and (iv) displays melt fracture behavior, such that the surface of the reinforcing fiber is rougher than a fiber formed without the mechanical activator polymer. Examples include nylon, polyvinyl alcohol and thermoplastic hydroxy-functionalized polyether or polyester.

Forming the Reinforcing Fiber

In general, the fibers may be formed by well-known processes, such as melt spinning, wet spinning, or conjugate spinning. The fibers of the present invention may be extruded into any size, or length desired. They may also be extruded into any shape desired, such as, for example, cylindrical, cross-shaped, trilobal or ribbon-like cross-section.

The fibers may have the following fiber cross-section structures:

(1) Side-by-side
(2) Sheath-core
(3) Islands-in-the sea and
(4) Citrus (Segmented pie).

(1) Side-by-Side

A method for producing side-by-side bicomponent fibers is described in U.S. Pat. No. 5,093,061, which is incorporated herein by reference. The method comprises: (1) feeding two polymer streams through orifices separately and converging at substantially the same speed to merge side-by-side as a combined stream below the face of the spinneret; or (2) feeding two polymer streams separately through orifices, which converge at the surface of the spinneret, at substantially the same speed to merge side-by-side as a combined stream at the surface of the spinneret. In both cases, the velocity of each polymer stream at the point of merge is determined by its metering pump speed and the size of the orifice. The fiber cross-section has a straight interface between two components.

Side-by-side fibers are generally used to produce self-crimping fibers. All commercially available self-crimping fibers are produced by using a system based on the different shrinkage characteristics of each component.

(2) Sheath-Core

Sheath-core bicomponent fibers are those fibers where one of the components (core) is fully surrounded by a second component (sheath). Adhesion is not always essential for fiber integrity.

The most common way to produce sheath-core fibers is a technique in which two polymer liquids (melts) are separately led to a position very close to the spinneret orifices and then extruded in sheath-core form. In the case of concentric fibers, the orifice supplying the "core" polymer is in the center of the spinning orifice outlet and flow conditions of core polymer fluid are strictly controlled to maintain the concentricity of both components when spinning. Modifications in spinneret orifices enable one to obtain different shapes of core or/and sheath within the fiber cross-section.

The sheath-core structure is employed when it is desirable for the surface to have the property of one of the polymers, such as luster, dyeability or stability, while the core may contribute to strength, reduced cost and the like. The sheath-core fibers are used as crimping fibers and as bonding fibers in the non-woven industry.

Methods for producing sheath-core bicomponent fibers are described in U.S. Pat. Nos. 3,315,021 and 3,316,336, both of which are incorporated herein by reference.

(3) Islands-in the-Sea

Islands-in-the sea fibers are also called matrix-filament fibers, which include heterogeneous bicomponent fibers. A method for producing islands-in-the sea fibers is described in U.S. Pat. No. 4,445,833, incorporated herein by reference. The method comprises injecting streams of core polymer into sheath polymer streams through small tubes with one tube for each core stream. The combined sheath-core streams converge inside the spinneret hole and form one island-in-the sea conjugate stream.

Mixing the different polymer streams with a static mixer in the spinning process also makes island-in-the-sea bicomponent fibers. The static mixer divides and redivides the polymer stream to form a matrix stream with multiple cores. This method for producing island-in-the-sea fibers is described in U.S. Pat. No. 4,414,276, which is incorporated herein by reference.

The islands-in-the-sea structure is employed when it is desirable to increase the modulus of the fiber, reduce moisture regain, reduce dyeability, improve the texturing capability or give the fiber a unique lustrous appearance.

(4) Citrus-Type (Segmented Pie)

The citrus-type bicomponent or segmented pie bicomponent fibers can be made by polymer distribution and/or spinneret modifications of the pack assemblies employed in the methods described above for producing the side-by-side, sheath-core or islands-in-the-sea fibers. For example, by introducing a first polymer stream and a second polymer stream alternately through eight radial channels toward the spinneret hole instead of two channels, the resultant fiber is an eight-segment citrus-type fiber. If the spinneret orifice has the configuration of three or four slots on a circle (a common orifice configuration to produce hollow fibers), the fiber is a hollow citrus-type fiber with eight segments. The hollow citrus-type fiber can also be made by the use of special spinneret orifice configurations with a sheath-core spin pack, as described in U.S. Pat. Nos. 4,246,219 and 4,357,290, both of which are incorporated herein by reference.

The Concrete Article

A concrete article is comprised of concrete having therein a reinforcing fiber, where at least about 50 percent of the reinforcing fiber are frayed only at the ends of the reinforcing fibers. "Frayed" is used in the same way as described above.

The concrete used to form the concrete article of this invention may be any suitable concrete, such as those known in the art. Generally, the concrete is a mixture comprised of Portland cement. Portland cement is used as is commonly understood in the art and defined by *Hawley's Condensed Chemical Dictionary* 12$^{th}$ Ed., R. Lewis, Van Nostrand Co., NY, p. 239, 1993.

It is understood that the reinforcing fiber in the concrete is a solid at ambient conditions. That is to say, the polymer is added as a solid object and is a solid after the concrete is cured.

The amount of reinforcing fiber in the concrete generally ranges from about 0.05 volume percent to about 10 volume percent of the concrete article. Preferably, the amount of the reinforcing polymer is at least about 0.1 percent, more preferably at least about 0.3 percent and most preferably at least about 0.5 percent to preferably at most about 3 percent, more preferably at most about 2 percent and most preferably at most about 1.5 percent by volume of the article.

Forming the Concrete Article

The concrete article may be made by mixing the reinforcing fiber, water and concrete in any suitable manner. Preferably, the concrete dry components (e.g., cement, sand and gravel) are dry mixed first and then water is mixed to make a wet mixture. Subsequently, the reinforcing fiber is mixed with the wet mixture for a sufficient time to fray the ends of at least 50 percent of the fibers, while not so long that the fibers start to completely fibrillate, for example, such that the surface area of the fibers increase substantially more than 10 times the surface area of the original fibers. This mixture is then cast, shotcreted or molded or dispensed by any suitable method, such as those known in the art.

Generally, the concrete is mixed with the reinforcing fiber for at least about 30 seconds to at most about 20 minutes. Preferably, the mixing time is at least about 1 minute, more preferably at least about 2 minutes and most preferably at least about 3 minutes to preferably at most about 15 minutes, more preferably at most about 10 and most preferably at most about 5 minutes.

To the mixture, other additives useful in the formation of concrete may be added, such as those known in the art. Examples include superplasticizers, water reducers, silica fume, furnace slag, air entrainers, corrosion inhibitors and polymer emulsions.

EXAMPLES

Examples of Reinforcing Fibers:
All percents are by weight unless otherwise specified.

Example 1

A sheath was comprised of 80 percent polyethylene (PE) (density 0.913), 10 percent 0.955 PE grafted with maleic anhydride (MAH) and 10 percent ethylene-styrene with 30 percent styrene copolymer and a core of polypropylene (PP) having a melt flow rate of 12. Each of these was obtained from The Dow Chemical Company, Midland, Mich.

The fiber was produced at Hills Inc. (W. Melbourne, Fla.) using commercially available melt spinning equipment. A round configuration was chosen, however, other shapes, such as trilobal, tipped trilobal and cross, micro-denier segmented pie, islands-in-the-sea and striped can be used as well. The sheath/core fibers were fabricated with a ratio of sheath to core from 25:75 to 40:60 by weight. The conditions used to form the fiber were:

Extrusion Temperature (° C.)

| Zone | PE Blend Sheath | PP Core |
|------|-----------------|---------|
| 1    | 86              | 215     |
| 2    | 193             | 240     |
| 3    | 220             | 250     |
| 4    | 217             | 260     |
| Melt | 266             |         |

Extruder Pressure: 750 psi
Speed of denier roll: 160 rpm
Speed of tension roll: 163 rpm
Draw ratio: 8:1
Quench temperature: 55° F.
Temperature of tension roll: 93° C.
Temperature draw roll #1: 110° C.
Temperature of draw roll #2: 130° C.
Spin head temperature: 270° C.
Optional Spin finish (surfactant): (5656 by Gouldstone Technologies, Monroe, N.C.) 12 percent by weight in water (applied prior to fiber fusing).

The reinforcing fiber consisted of 72 fused micro-fiber (filaments) and had an overall denier of about 1800 (72 filaments), a tenacity of 4.5 gram per denier and an elongation of 29 percent.

Example 2

A sheath was comprised of 80 percent PE (density 0.913 gram per cc), 10 percent ethylene acrylic acid (PRIMACOR) and 10 percent ethylene-styrene with 30 percent styrene copolymer and a core of PP having a melt flow rate of 12. Each of these was obtained from The Dow Chemical Company, Midland, Mich. This reinforcing fiber was made in a similar manner as Example 1.

Example 3

A sheath was comprised of 80 percent PE (0.913 gram per cc), 10 percent 0.870 PE grafted with MAH and 10 percent PE 0.955 gram per cc grafted with MAH and a core of PP having a melt flow rate of 20. Each of these was obtained from The Dow Chemical Company, Midland, Mich. This reinforcing fiber was made in a similar manner as Example 1.

Example 4

A sheath was comprised of 80 percent PE (0.913 gram per cc), 10 percent ethylene-methacrylic acid copolymer (EMAA), 10 percent ethylene-styrene with 30 percent styrene and a core of PP having a melt flow rate of 4. Each of these was obtained from The Dow Chemical Company, Midland, Mich. This reinforcing fiber was made in a similar manner as Example 1.

Example 5

A sheath was comprised of 70 percent PE (0.913 g/cc), 20 percent ethylene acrylic acid, 10 percent ethylene-styrene, with 20–35 percent of styrene copolymer and a core of PP having a melt flow rate of 12. Each of these was obtained from The Dow Chemical Company, Midland, Mich. This reinforcing fiber was made in a similar manner as Example 1.

Example 6

A sheath was comprised of 80 percent PE (0.913 gram per cc), 10 percent ethylene acrylic acid copolymer with 9.6 percent acid groups, 10 percent of maleic anhydride grafted low density PE (0.870 gram per cc), and core of PP having a flow rate of 12. Each of these was obtained from The Dow Chemical Company, Midland, Mich. This reinforcing fiber was made in a similar manner as Example 1.

Example 7

A concrete mixture was prepared by blending 12.95 volume percent Portland cement (Holnam Type 1), 35.28 volume percent sand (2NS), 28.9 volume percent Pea Gravel, 21.38 volume percent tap water, 0.49 percent superplasticizer (assuming 40 percent solids-WRDA-19 from W R Grace) and 1.0 volume percent polymer fibers. The ratio of cement to water was 0.52.

The polymer fibers were a bi-component fiber comprised of a core of polypropylene and a sheath comprised of a PE based blend. The polypropylene was a 12 melt flow rate polypropylene (INSPIRE H509-12G polypropylene, available from The Dow Chemical Company, Midland, Mich.) and constituted about 70 percent by weight of the fiber.

The dry ingredients (e.g., cement, sand and gravel) were first added and then water was added to make a base mixture. The reinforcing fiber (about 2 inches long) was then added to the base mixture. The dispensing was easy and fibers did not show any tendency for interlocking and balling. The total mixing time was about 5 minutes. The slump measured for this concrete mix was about 120 mm and air content was about 6 percent. The fibers fibrillate at the fiber ends enough to increase the surface area to about 2 times of the original surface area of the fibers. (For comparison, the slump of a concrete mix containing fibers fibrillated to 5 times is about 75 mm and into individual monofilaments is about 40 mm.) The concrete mixture containing fibers was placed into rectangular bar molds that were 4 inches by 4 inches by 14 inches and cured in a water bath at a constant temperature of 20° C. for 14 days. In addition, the concrete mixture containing the fibers was cured for 1 and 14 days under the same conditions in cylindrical molds (diameter of 3 inches and height of 6 inches).

After 14 days of curing, the rectangular bars had an average first crack strength of 4.1 MPa (ranging between 3.9 and 4.6), as determined in a 4-point bend test. The toughness was 30–40 Nm using the Japanese Toughness Method JSCE SF4. The compressive strength of the cylindrical bars after 1 and 14 days of curing was 16 MPa and 36 MPa as measured by a standard compression test.

Comparative Example 1

Concrete bars without fibers were made in the same way as described in Example 1. The slump value was about 200 mm. The results for these bars were as follows. The average first crack bend strength after 14 days cure was 4.5 MPa. The average toughness was about 1 Nm. The compressive strength of the bars after 1 and 14 days of curing was 15 MPa and 42 MPa.

Comparative Example 2

Concrete bars were made in the same way as in Example 1, except that the fibers were commercially available crimped polypropylene fibers from Synthetic Ind. (Synthetic Ind., Chatanooga, Tenn.). The fiber was about 2 inches in length, had a cross-section of about 0.6 mm$^2$ and a tenacity of about 4.5 grams per denier. Fibers dispensed into the concrete mix without interlocking and no balling action was observed. This fiber does not provide any fibrillation and, as a result, slump is unaffected (200 mm). The average first crack bend strength after the 14-day cure was about 3.8 MPa. The toughness was about 25 Nm. The compressive strength of the bars after 1 and 14 days of curing was 15 MPa and 37 MPa, respectively.

Comparative Example 3

Concrete bars were made in the same way as in Example 1, except that the fibers were commercial polypropylene fibers from WR Grace Corp (Boston, Mass.). The fiber was about 2 inches in length. The fiber showed a tendency for very strong interlocking and had to be individually dispensed into the concrete. Slump value of the concrete mix was about 125 mm. The fiber showed very little fibrillation (even if mixing time was increased to 10 and 20 minutes) about 1.3 times of the original surface area. The average first crack bend strength after the 14-day cure was about 4.2 MPa. The average toughness was about 28 Nm. The compressive strength of the bars after 1 and 14 days of curing was 12 MPa and 35 MPa, respectively.

Example 8

The fiber of Example 2 was used to prepare several mixes according to the method of Example 7. The mixing time of the fiber in the concrete was varied to achieve different levels of fraying. The concrete mixes containing fibers were cast into a 4×4×14 inches mold and cured for 28 days. Toughness was measured by using Japanese Toughness Standard.

TABLE I

| Mix | Mix Time (min) | Frayed Fiber Surface Area Over Original Fiber Surface Area ($SA_f/SA_o$) | Toughness (Nm) |
|---|---|---|---|
| A | 3 | 1.5 | 31 |
| B | 5 | 2 | 34 |
| C | 10 | 3 | 36 |
| D | 15 | 5.6 | 34 |
| E | 17 | 9.5 | 27 |
| F | 20 | 13.5 | 21 |

The increase in the surface area was measured by counting under microscope individual monofilaments that frayed from the original fiber and converting number and length of frayed pieces into surface area. Twenty fibers were measured in every case to calculate average number of frayed monofilaments.

Example 9

The fiber of Example 5 was used to prepare several batches of concrete according to the method of Example 7 and varying the mix time as in Example 8.

TABLE II

| Mix | Mix Time (min) | Frayed Fiber Surface Area Over Original Fiber Surface Area ($SA_f/SA_o$) | Toughness (Nm) |
|---|---|---|---|
| A | 1 | 1.5 | 30 |
| B | 3 | 2 | 33 |
| C | 5 | 5.8 | 32 |
| D | 7 | 9.6 | 27 |
| E | 10 | 16 | 21 |
| F | 15 | 20 | 17 |

Examples 8 and 9 demonstrate that different sheath polymers have different rates of fibrillation. It also shows that the surface area increase, as determined microscopically, may be used as an indicator to show that the fibers have been fibrillated too much (i.e., the fibers are not predominately frayed at the ends).

What is claimed is:

1. A concrete article comprised of concrete having therein a reinforcing fiber where at least about 50 percent of the reinforcing fibers are solely frayed at an end or ends of the reinforcing fibers.

2. The concrete article of claim 1 wherein at least 60 percent of the reinforcing fibers are frayed solely at an end or ends of the reinforcing fibers.

3. The concrete article of claim 1 wherein at least about 60 percent of the reinforcing fibers are frayed only at an end or ends of the reinforcing fibers.

4. The concrete article of claim 3 wherein at least about 75 percent of the reinforcing fibers are frayed only at an end or ends of the reinforcing fibers.

5. The concrete article of claim 1 wherein the reinforcing fiber is comprised of at least two filaments bonded together and the filaments being comprised of a polymeric core at least partially enveloped by a polymeric sheath comprised of a fusing-fraying polymer that has a lower melting temperature than the polymer core, the fusing-fraying polymer fusing the filaments together such that the reinforcing fiber, when mixed with inorganic particulates, frays predominately only at an end or ends of the fiber.

6. The concrete article of claim 5 wherein the polymer core is polypropylene having a melt flow rate from about 8 to 16.

7. The concrete article of claim 5 wherein the the fusing-fraying polymer is low density polyethylene, ethylene styrene copolymer, low density polyethylene grafted with maleic anhydride, maleic anhydride-grafted polypropylene, ethylene acrylic acid copolymer, ethylene-methacrylic acid or combinations thereof.

8. The concrete article of claim 5 wherein the fusing-fraying polymer is ethylene acrylic acid copolymer or ethylene styrene copolymer.

9. The concrete article of claim 6 wherein the fusing-fraying polymer is polyethylene having a melt index from about 5 to abut 35 and a density from about 0.9 gram per cc to about 0.965 gram per cc.

10. The concrete article of claim 1 wherein the sheath contains a mechanical activator polymer.

11. The concrete article of claim 10 wherein the mechanical activator polymer is nylon, polyvinylalcohol, thermoplastic hydroxyl-functionalized polyether or polyester or combinations thereof.

* * * * *